Patented Nov. 26, 1940

2,222,993

UNITED STATES PATENT OFFICE 2,222,993

PROCESS OF RECOVERING AMINO ACIDS

Gerrit Toennies, Narberth, Pa., assignor to The Lankenau Hospital, Philadelphia, Pa., a corporation of Pennsylvania No Drawing. Application May 7, 1938,
Serial No. 206,532

17 Claims. (Cl. 260—529)

This invention relates to improved methods of separating or recovering amino acids from mixtures or source materials such as the acid hydrolysates of proteins, and mixtures which may be produced by treatment of such hydrolysates in ways that are hereinafter indicated. Such source materials have the common characteristic that the amino acids in them are, so to speak, contaminated with hydrolizing or other acid or its characteristic radical—whether free, or in combination with the amino acids, or even in the form of salts. Generally, a source material such as here referred to comprises a mixture of various amino acids, rather than any single amino acid by itself.

The most commonly known process for the purpose of obtaining mixtures of free amino acids resulting from the hydrolysis of proteins by acid hydrolizing agents, consists of using sulfuric acid as the hydrolizing agent, neutralizing the latter by means of hydroxides of the alkaline earths, and separating the amino acids from the insoluble sulfate by extraction or elution with water. The disadvantage of this method lies in the relatively great bulk of the resulting sulfate which tends to retain an appreciable part of the amino acids and especially those of the amino acids which have a low solubility in water. The use of hydrochloric acid and removal of the latter as silver chloride suffers from similar disadvantages in addition to the cost of the reagent involved.

As a result of these limitations some methods have been patented in recent years which seek to achieve by novel means the desired end of obtaining amino acid mixtures free of the hydrolizing agent. Such methods have been described, for instance, by Gesellschaft fuer Kohletechnik m. b. H. in British Patent #435,839 (September 30, 1935), United States Patent #2,071,282 (February 16, 1937), German Patents #647,989 (July 19, 1937), #653,099 (November 15, 1937), and #654,653 (December 28, 1937), or by Chemische Fabrik Flora in Swiss Patent #185,415 (December 1, 1936). These methods utilize the insolubility of certain inorganic salts in solutions saturated with ammonia in which amino acids are soluble, or the migration of inorganic ions under the influence of an electric field at hydrogen ion concentrations at which most of the naturally occurring amino acids exist in electrically neutral forms, and therefore are not subject to electrolytic migration.

I have discovered a novel method for obtaining amino acid mixtures from source materials such as acid protein hydrolysates which is not related to the methods found in the scientific and patent literature, and which is superior to the known art by combining simplicity with a high degree of completeness of recovery of the free amino acids obtainable from proteins.

According to my invention the acid used for protein hydrolysis is, after completion of hydrolysis, neutralized not, as has been the practice, by an inorganic base, but by an organic base. While the salts of inorganic acids with inorganic bases are generally of low solubility in organic solvents while being soluble in water, and thus are qualitatively similar to most of the amino acids, in that the latter are also much more soluble in water than in organic solvents, there are many salts of inorganic acids with organic bases which differ from the amino acids in that they are highly soluble in various organic media in which amino acids are practically insoluble. My invention allows of utilizing these fundamental solubility differences, (a) between salts of inorganic and organic bases and (b) between amino acids and salts of organic bases, for the purpose of separating amino acid mixtures from the agents used for the hydrolysis of proteins or from inorganic salts that might be formed therefrom.

A particular advantage of my method is that the amino acids resulting from the separation may be obtained directly in the solid state rather than in a state of solution, as in other methods, like those cited above.

The application of my method to the separation of amino acids from protein hydrolysates involves using for the hydrolysis acids which with readily available organic bases will form salts that are substantially neutral with regard to the majority of the amino acids and that are soluble in organic solvents or solvent combinations in which amino acids or their mixtures are practically insoluble; neutralizing the acid or acids present in the hydrolysate, after completion of the hydrolysis, with an organic base (or bases) of which the resulting salt or salts are substantially neutral with regard to the majority of the amino acids while being soluble in organic solvents or solvent combinations that do not dissolve amino acids or their mixtures; and treating the resulting mixture of amino acids and salts with the selected organic liquid—in such a manner and in such proportions as to effect the optimally possible or desired degree of separation between the insoluble material which consists substantially of amino acids and the soluble salts and other impurities. This latter step implies, of course, the preceding removal, by evaporation or distillation, of water or other liquids which made up the medium of hydrolysis, to such an extent that their residual content will not adversely affect the desired separation—as it might, for instance, by increasing to an undesirable extent the solubility of the amino acids in the organic solvent used, or by causing formation of emulsions or other separations into several liquid phases. This removal can be effected either before or after the addition of the base. Distillation to dryness before the addition of the base has the advantage, in the case of the use of a volatile acid, such as hydrochloric acid, of removing,—together with the water or other volatile components of the medium,—most of the free excess of the latter, thereby reducing the amount of base subsequently required for neutralization. This is desirable for reasons of economy as well as because in some systems of salts of organic bases in organic media the solubility of amino acids is measurably increased by increasing concentrations of the salt. This phenomenon has been observed by Pirie (Biochem. Journ. 12, 1270 (1932)) in the case of the amino acid methionine in ethylalcoholic solutions of pyridine hydrochloride, and I have found it confirmed in propyl-alcoholic solutions, and also in the case of hydrochlorides of some other organic bases such as aniline or dimethylaniline. Another advantage of reducing the amount of base required for neutralization is the greater ease of complete removal of the dissolved salt in the subsequent step of washing the mixture of solid amino acids.

On the other hand, distillation of an acid protein hydrolysate to the point of the highest possible degree of removal of volatile liquid and acid generally results in a semi-solid paste, which renders a uniform and homogeneous neutralization difficult. One preferred form of procedure, therefore, consists in distilling down the hydrolysate as far as possible, thereby removing as much volatile acid as possible, adding to the residue enough water, preferably hot, to produce a liquid paste, effecting neutralization, again evaporating to dryness, and finally treating or extracting the residue with the appropriate solvent until the soluble salt is removed as far as possible and the solid amino acid mixture remains behind.

Another possibility consists in treating the residue of the first evaporation with enough of a lower alcohol, preferably methylalcohol, to produce a liquid mixture, before adding the base. In this case re-evaporation is less important, for reasons of yield, purity and physical condition of the final product, than in the case of adding water to the first evaporation residue.

However, an amino acid mixture can also be obtained by neutralizing the hydrolysate, evaporating to a small volume,—but not to dryness,— and adding the organic liquid, which must be miscible with water in addition to being a good solvent for the salt to be removed and a poor solvent for the amino acid mixture.

The principle which underlies the methods disclosed in this specification can also be applied to the separation of amino acids from inorganic salts. When such a mixture is treated with an excess of a halide acid such as hydrochloric acid, and evaporated, a mixture of inorganic salts and halide-acid compounds of the amino acids results. It is known that the hydrochlorides of amino acids are generally soluble in the simple aliphatic alcohols, especially in the lower ones like methylalcohol, while inorganic salts generally have a low solubility in such alcohols. The desired separation may therefore be effected by digesting the mixture of salts mentioned with an alcohol (which will dissolve the amino acid salts present while being a poor solvent for the accompanying inorganic salts), and adding an organic base (which with the acid present in combination with the amino acids forms a salt that is soluble in the alcohol used) in an amount sufficient for neutralization.

A variant of this application of the disclosed principle to the separation of amino acids from inorganic salts comprises digesting the mixture with such an amount of concentrated aqueous hydrochloric acid as will be sufficient to dissolve the amino acids, then adding a water-miscible alcohol, such as methyl, ethyl or propyl alcohol, in such an amount as is necessary to lower the water concentration of the resulting mixture sufficiently to reduce the solubility of the inorganic salts present to a level negligible for the practical purpose of separation, hereupon separating the solution of amino acid hydrochlorides from the solid inorganic salts, and neutralizing the separated solution with an organic base that forms a hydrochloride soluble in the medium.

Instead of employing alcoholic solutions of hydrochloric acid, or other halide acids, in the separation of amino acids from inorganic salts, solutions of perchloric acid in organic media may be used. The special feature of the use of perchloric acid and its possible advantage lies in the fact—which I have discovered and the general applicability of which, especially to the preparation of amino acid mixtures, is also publicly disclosed for the first time in this specification— that while the solubility of hydrochlorides of amino acids in aliphatic alcohols rapidly decreases in ascending the series of homologous alcohols or generally in turning from "more water-like" solvents to "less water-like" ones, the solubility of perchlorates extends appreciably higher in a homologous series or into "less water-like" media. The meaning of "less water-like" may be illustrated by the decreasing part of the molecule represented by the "water-like" hydroxyl group in ascending a homologous series of alcohols or in turning from the "water-like" ethyl alcohol (R—OH) to the less "water-like" ethyl ether (R—O—R), or from the "water-like" acetic acid (RCO—OH) to the less "water-like" acetone (RCO—R) or acetonitrile (RCN). I have found the principle of increased solubility of amino acid perchlorates, as compared with hydrochlorides, demonstrated by the fact that amino acid mixtures resulting from the hydrolysis of egg albumin are soluble with difficulty in mixtures of hydrochloric acid and isopropyl alcohol of low water content while a comparable mixture containing perchloric acid instead of hydrochloric acid readily dissolves the amino acids. And I have disclosed in an earlier patent specification (United States Patent #2,049,480, issued August 4, 1936) that the perchlorate of the amino acid cystine is easily soluble in acetonitrile, that is in a medium in which the hydrochloride and similar salts are practically insoluble. I have also utilized this principle, which on theoretical grounds appears linked to the considerably higher relative acidity of perchloric acid as compared with hydrochloric acid and other halide acids, by dissolving cystine in solutions of concentrated aqueous perchloric acid in amylalcohol (Journ. Biol. Chem. 122, 27 (1937)).

The wider range of solvents possible in the case of perchloric acid introduces the possibility of utilizing certain desirable solvent combinations which in the case of hydrochlorides are excluded. Perchloric acid in glacial acetic acid may be used to dissolve amino acids and thus separate them from inorganic salts or certain other impurities. Large proportions of ether may be added to the solution of amino acid perchlorates in acetic acid, resulting in the precipitation of any dissolved inorganic salts without percipitating any amino acids until a suitable base is added. Similarly mixtures of ether and isopropylalcohol, which would not keep amino acid hydrochlorides in solution, are good solvents for the corresponding perchlorates.

Another advantage, in addition to increasing the range of possible solvents for amino acid salts and thus improving their separation from inorganic salts, is inherent in the application of perchloric acid, namely, the fact that the tendency of ester formation between alcohol and acid is much less in the case of perchloric than of hydrochloric acid. Thus, while solutions of concentrated hydrochloric acid in methyl, ethyl, propyl, butyl or amyl alcohol show decreasing acidity at measurable rates, I have found no sign of such tendency in solutions of 70 per cent perchloric acid in the alcohols named.

When perchloric acid is used in connection with the separation of amino acid mixtures the choice of the neutralizing base is, of course, governed by limitations analogous to those earlier mentioned.

In some cases it will be desirable to take advantage of the possibility of making the separation of amino acids more complete or of rendering filtration more convenient by adding an appropriate amount of an organic solvent which must be miscible with the solvent or solvent mixture present and which also must be a good solvent for the salt of the organic base while it need not be a solvent for the hydrochlorides, perchlorates, etc., of amino acids, but may, on the contrary, have even less dissolving power for the free amino acids than the medium used in the stages of dissolving and neutralizing the amino acid salts.

By way of illustrating how the principles outlined in this specification may be applied in actual practice the following examples are given. These examples are far from exhausting all of the possibilities that are inherent in the principles that form the foundation of this specification. They merely serve to illustrate, by a few of the possible embodiments, the nature of my invention, which, as is evident to those skilled in the art, permits of numerous variations and applications without departing from the spirit thereof or from the scope of the appended claims.

*Example 1*

158 grams of a hydrolysate syrup, obtained by evaporating under reduced pressure a hydrochloric acid hydrolysate of 100 grams of anhydrous egg albumin, are dissolved in about 235 cc. of boiling water. The total acid content of this liquid mixture is determined by titration of an aliquot fraction. On the basis of the obtained figure an amount of amylamine, exceeding by about ten per cent the calculated quantity, is added to the mixture with appropriate cooling. The neturalized mixture is distilled under reduced pressure, as far as possible, and the thickened residue is left in a high vacuum in the presence of concentrated sulfuric acid as a drying agent and absorbent for any excess of the volatile organic base. After a few days the asphalt-like residue is digested with about 470 cc. chloroform until a homogeneous mixture results. By diluting with about 3750 cc. acetone the amino acids are precipitated in a flaky filterable form. The precipitate is filtered by suction and, without sucking it dry, is transferred into centrifuge tubes while still in a pasty semi-liquid state. When the precipitate is allowed to dry at this stage resuspending and effective washing is rendered difficult. The precipitate is resuspended in portions of about 240 cc. acetone and centrifuged. This treatment is repeated until the decanted liquid shows by titration with sodium methylate (Journ. Biol. Chem. 101, 727 (1933)) that the amount of amylamine hydrochloride that is being extracted has become sufficiently small to indicate that the amounts of the salt left in the precipitate have become as small as desired. The precipitate is now dried by vacuum treatment at room temperature, finally leaving it in a high vacuum in the presence of concentrated sulfuric acid (which is a good absorbent for acetone vapors) and saturated sodium hydroxide solution (to absorb any acid vapors that might arise). The product of a separation carried out according to these details appeared as a light brown dusty powder which in weight corresponded to 92 percent of the protein involved; it is easily soluble in water, except for a few dark flakes, producing a solution of about pH 4.5. An analysis showed a content of 2.0 percent amylamine, 0.7 percent ammonia and 4.2 percent chloride. These contaminations can be further reduced if the acetone treatment is continued before putting the mixture into the dry state. However, a certain amount of fixed chloride must be expected when in the protein under consideration the stoichiometric balance between the resulting acid amino acids (dicarboxylic acids such as glutamic or aspartic acid) and the basic amino acids (such as histidine or lysine) is such that a stoichiometric excess of the basic amino acids is present, just as a certain amount of fixed base would be retained when the dicarboxylic acids are in excess.

*Example 2*

In a manner largely similar to that described in Example 1 an evaporation residue (167 grams) of a hydrochloric acid hydrolysate of gelatine (100 grams) was treated with hot water, amylamine and, after re-evaporation, with chloroform (625 cc.) and acetone (3750 cc.). Final washing was effected by several hours extraction by boiling acetone in a Soxleth extractor. The weight of the resulting grayish-white, water soluble powder was 99.5 percent of that of the anhydrous gelatine used.

*Example 3*

An analogous operation, carried out on a similar hydrolysate residue (157 grams) of casein (100 grams), using the same amounts of chloroform and acetone as in Example 2, produced a light brown, water soluble powder corresponding to 99 percent of the weight of the anhydrous casein which entered into the operation.

*Example 4*

An evaporation residue (158 grams) of hydrochloric acid hydrolysate of egg albumin (100 grams anhydrous) is digested with about 235 cc. methylalcohol to a homogeneous mixture. The appropriate amount (cf. preceding examples) of amylamine is added, followed by about 4000 cc. of acetone. The precipitated amino acid mixture is filtered and dried. The yield of dry material obtained according to this example, and where the step of washing was omitted, was 113 percent of the original protein weight, nidicating contamination with amylamine hydrochloride, since the maximum possible yield, taking into account the water added by the hydrolysis, is 108 percent.

Example 5

158 grams of the same egg albumin hydrolysate residue is digested with 120 cc. hot water, neutralized by an excess of amylamine, precipitated by the addition of 3200 cc. acetone. Application of this method resulted in a yield, in terms of weight, of 75 percent.

Example 6

When a hydrochloric acid hydrolysate of egg albumin is neutralized with sodium hydroxide and evaporated to a moderate volume a mixture of sodium chloride and amino acids separates (Hill and Robson, Biochem. Journ. 28, 1008 (1934)). The amount of amino acids in such a mixture, in terms of the amount of strong acid which is equivalent to the free basic groups of the amino acids, is determined by titrating an aliquot portion with perchloric acid in acetic acid (method of Harris, Biochem. Journ. 29, 2820 (1935)). On the basis of the obtained value the mixture is digested, with application of heat, with the calculated amount of 10 molar hydrochloric acid, an amount of isopropyl alcohol equal in volume to about eight times that of the hydrochloric acid is then added, the residue of inorganic salt is filtered off, and the required amount of amylamine is added to the filtrate. The weight of amino acid precipitate obtained in this manner was, after washing and drying, 87 percent of that of the amino acids present in the mixture used.

Example 7

A mixture of amino acids and sodium chloride similar to the one referred to in Example 6 is treated with the equivalent amount of a solution of one volume of concentrated (11 molar) aqueous perchloric acid in nine volumes of glacial acetic acid. Crystal violet may be used as an indicator to show by the persistence of its yellow color that a permanent excess of perchloric acid is present. Ether is added in about six times the volume of the perchloric acid-acetic acid mixture used), the sodium chloride is filtered off and the filtrate is neutralized by amylamine. The yield of precipitated amino acids, filtered, washed and dried, was 41 percent of the calculated amount in this experiment, suggesting a method of fractionation. The product is of pure white homogeneous appearance. Additional precipitate can be obtained by adding more ether and, if oily separations occur, acetone.

Economical considerations, the required purity of the final product, and other considerations inherent in the individual problem will decide which of the numerous possible forms of application of the main principle disclosed in this specification, and illustrated by some examples, will be preferable. The basic principle of this invention is the separation of amino acid mixtures from acids or salts by utilizing the fact that amino acids are insoluble in most inert organic solvents while many salts of inorganic as well as organic acids with organic bases are soluble in such solvents.

As regards the substances that have been put to new uses by my intention, they are of three classes: (a) acids, (b) bases and (c) organic solvents.

Among acids halide acids, and especially hydrochloric acid, have been referred to as hydrolizing agents, and the application of the invention to their removal has been discussed and described. Obviously other acids, organic and inorganic ones, can be employed as long as they are serviceable in the hydrolysis of proteins or in dissolving amino acids, and as long as they fulfill the conditions of forming salts with the amino acids and with suitable bases that are soluble in the type of media that otherwise are inert with regard to amino acids. Formic acid, for instance, which has been used to advantage as a co-agent in protein hydrolysis (Journ. Biol. Chem. 107, 395, 110, 343; 118, 101) would obviously not interfere with the application of the methods here disclosed. Nor would the use of sulfuric acid as the hydrolizing acid exclude the application of these methods by suitable modifications readily devised by those skilled in the art. Among other acids perchloric acid specifically has been shown to be applicable to the separation of amino acids and to possess certain advantages over other mineral acids which are inherent in its higher acid strength.

Among bases preference has been given to amylamine in this specification. Examples of other bases which have been found to act in a comparable manner are pyridine, aniline, dimethyaniline or butylamine. All of these have been found to form hydrochlorides soluble in isopropyl alcohol. The solubility of the hydrochlorides of pyridine and amylamine in chloroform has been tested and found to be high. Differences in solubility are, however, to be expected and are readily ascertained experimentally. For instance in an acetic acid-ether mixture (1:3 by volume) the perchlorates of aromatic bases were found to crystallize while those of butyl or amylamine were found soluble.

Among organic solvents reference has been made in the foregoing to various of the lower aliphatic monovalent alcohols, to acetone, to acetic acid, to ether and to chloroform. Obviously there will be other solvents which will find their proper place within the scope of this invention, as long as they comply with the inherent limitations as regards solvent power, miscibility, chemical stability, vapor pressure, viscosity and other obvious requirements. In general acetone is a better solvent for amine hydrochlorides than ether, although mixtures of ether with alcohols are also good solvents. Chloroform has been found more effective in digesting a crude mixture of amino acids and amylamine hydrochloride than acetone, although the precipitation of the amino acids is made more complete and their separation by filtration or centrifugation is rendered easier by the subsequent addition of acetone.

No definite rules can be laid down regarding the amounts and proportions of the different components to be employed. They are governed by such factors as solubilities, miscibilities or completeness of precipitation which are readily appreciated by those skilled in the art.

As regards the products which are obtainable according to the principles set forth herewith, it is not claimed that they represent pure mixtures of amino acids. Certain chemically ill-defined colored impurities of the type usually met with in acid protein hydrolysates are present as contaminants, in addition to small residues of the organic salt used. The distinguishing characteristic of my products is rather that they contain, when produced under optimal conditions, a higher percentage of the amino acids present in hydrolysates, than it has been possible to isolate by the classical procedures available for the purpose, and that my method is less discriminatory with regard to different members of the amino acid family than other methods, inasmuch as neither water-insoluble nor alcohol-soluble amino acids tend to be excluded from recovery.

The value of the products may thus be seen chiefly in their being able to serve as a basis for further purification in the manufacture of pure mixtures of amino acids which are representative in their composition of the natural make-up of native proteins. At the same time it obviously seems likely that products obtained according to the principles here disclosed will prove useful in the isolation and manufacture of some of the individual amino acids.

I claim as new:

1. A process for recovering amino acids from source material of the group consisting of protein hydrolysates, the amino acid compounds that are in such hydrolysates, mixtures of salts with amino acids, and mixtures of amino acid compounds with salts; which process comprises reacting and neutralizing the unwanted or contaminant acid component of the source material with an organic base which forms therewith a salt that is substantially neutral with respect to the amino acid to be recovered, and dissolving the salt resulting from the reaction by means of organic solvent in which the amino acid is relatively insoluble, and separating the resulting solution from the undissolved amino acid.

2. The invention as set forth in claim 1 including the step of evaporating the mixture to a relatively small volume before the step of dissolving by means of organic solvent.

3. In the recovery of amino acids from hydrolysates of proteins with volatile acids, the combination of steps which comprises evaporating off superfluous water from the hydrolysate, thereby also driving off hydrolizing acid therefrom, recombining the residue with diluent liquid which does not react therewith, and neutralizing the unwanted acid therein with an organic base which forms therewith a salt that is neutral with respect to the amino acid to be recovered, and dissolving the salt resulting from the reaction of said organic base with said unwanted acid by means of organic solvent in which the amino acid is relatively insoluble.

4. In the recovering of amino acids from the amino acid hydrochlorides that are in hydrochloric acid hydrolysates of proteins, the combination of steps which comprises neutralizing the hydrochloric acid of the amino acid hydrochloride with added amylamine, and precipitating the amino acid from the neutralized product with acetone added thereto.

5. The invention as set forth in claim 4 wherein the amino acid hydrochloride is digested with methyl alcohol to a substantially homogeneous paste before neutralization with amylamine.

6. In the recovery of amino acids from hydrochloric acid hydroylsates of protein, the combination of steps which comprises evaporating off water from the hydrolysate, and thereby also driving off hydrochloric acid therefrom, recombining the residue with diluent liquid which does not react therewith, and neutralizing the unwanted acid therein with an organic base whose hydrochlorides are soluble in chloroform and in acetone, but are neutral with respect to the amino acid to be recovered, evaporating off the previously added solvent from the neutralized residue, and digesting the same with chloroform into a homogeneous paste, and adding acetone thereto until the amino acid separates in the solid state.

7. In the recovery of amino acids from protein hydrolysates, the combination of steps which comprises reacting and neutralizing the unwanted or contaminant acid component of the hydrolysate with an inorganic base, thus forming an inorganic salt of the unwanted acid, and liberating the amino acid component of the hydrolysate in intermixture with said inorganic salt, reacting and combining the amino acid in this mixture with other acid; dissolving the amino acid compound thus formed by means of organic solvent in which both the inorganic salt and the amino acid are relatively insoluble, and separating the resulting solution from the undissolved inorganic salt, and reacting and neutralizing the unwanted acid component of the last-mentioned amino acid compound with an organic base which forms therewith a salt that is substantially neutral with respect to the amino acid.

8. In the separation of amino acids from inorganic salts in a mixture, the combination of steps which comprises reacting and combining the amino acid in the mixture with other acid, dissolving the amino acid compound thus formed by means of organic solvent in which both the inorganic salt and the amino acid are relatively insoluble, and reacting and neutralizing the unwanted acid component of this amino acid compound with an organic base which forms therewith a salt that is substantially neutral with respect to the amino acid.

9. In the separation of amino acids from inorganic salts in a mixture, the method which comprises reacting and combining the amino acid in the mixture with other acid, dissolving the amino acid compound thus formed in the mixture by means of organic solvent in which both the inorganic salt and the amino acid are relatively insoluble, and separating the resulting solution from the undissolved salt, reacting and neutralizing the unwanted acid component of the amino acid compound with an organic base which forms therewith a salt that is substantially neutral with respect to the amino acid, and dissolving the resulting salt in the organic solvent of the character aforesaid, while liberating the amino acid, and separating the resulting solution from the undissolved amino acid.

10. In the recovery of amino acids from source material comprising a solution in organic solvent of compounds of the amino acids with other acids, the combination of steps which comprises neutralizing said amino acid solution with an organic base, thereby forming an organic base salt of the other acid, and liberating the amino acid, and adding to the neutralized solution another solvent that is miscible with that already present, and is a good solvent for the organic base salt formed as aforesaid.

11. In the separation of amino acids from inorganic salts in a mixture, the combination of steps which comprises reacting and combining the amino acid in the mixture with perchloric acid, dissolving the amino acid compound thus formed by means of organic solvent in which the inorganic salt and the amino acid are relatively insoluble, and reacting and neutralizing the perchloric acid component of the amino acid compound with an organic base which forms therewith a perchlorate that is substantially neutral with respect to the amino acid to be recovered, but is soluble in the organic solvent present.

12. The invention as set forth in claim 11 wherein the mixture of amino acid and inorganic salt is treated with perchloric acid in glacial acetic acid.

13. The invention as set forth in claim 11 wherein the organic solvent there referred to comprises ether, mixed with glacial acetic acid.

14. The invention as set forth in claim 11 wherein the organic solvent there referred to comprises both ether and isopropyl alcohol, mixed with glacial acetic acid.

15. In the separation of amino acids from sodium chloride in a mixture, the combination of steps which comprises reacting and combining the amino acid in the mixture with other acid, adding organic solvent for the resulting amino acid compound in which the sodium chloride is relatively insoluble, and separating the solution from the resulting sodium chloride precipitate, and neutralizing the solution with an organic base whose hydrochloride is substantially neutral with respect to the amino acid to be recovered, but is soluble in said organic solvent.

16. The invention as set forth in claim 15 wherein the other acid employed is perchloric acid, and the organic solvent comprises ether.

17. In the separation of amino acids from sodium chloride in a mixture, the combination of steps which comprises digesting the mixture with a solution of concentrated perchloric acid in glacial acetic acid, and thus reacting and combining the amino acids in the mixture with perchloric acid, adding ether, and thereby precipitating the sodium chloride, and separating the solution from the sodium chloride precipitate, and neutralizing the perchloric acid component therein with amylamine.

GERRIT TOENNIES.